(12) United States Patent
Harrington

(10) Patent No.: US 7,945,071 B2
(45) Date of Patent: May 17, 2011

(54) AUTOMATICALLY GENERATING PRECIPITATION PROXIMITY NOTIFICATIONS

(75) Inventor: Nathan John Harrington, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 11/971,485

(22) Filed: Jan. 9, 2008

(65) Prior Publication Data

US 2009/0175489 A1     Jul. 9, 2009

(51) Int. Cl.
G06K 9/00          (2006.01)
G01S 13/00         (2006.01)
(52) U.S. Cl. .................. 382/100; 382/274; 342/26 B
(58) Field of Classification Search .................. 382/100, 382/103, 106, 123, 155, 162, 168, 173, 181, 382/193–195, 199, 206, 232, 254, 274, 276, 382/284, 286–298, 305, 312; 702/3; 342/26 B; 345/419
See application file for complete search history.

(56) References Cited

U.S. PATENT DOCUMENTS

| | | | |
|---|---|---|---|
| 5,196,854 A * | 3/1993 | Mathews | 342/26 B |
| 5,440,483 A * | 8/1995 | Badoche-Jacquet et al. | 702/3 |
| 6,128,578 A * | 10/2000 | Sakaino et al. | 702/3 |
| 6,581,009 B1 | 6/2003 | Smith | |
| 6,683,609 B1 * | 1/2004 | Baron, Sr. et al. | 345/419 |
| 6,850,184 B1 * | 2/2005 | Desrochers et al. | 342/26 D |
| 7,231,300 B1 * | 6/2007 | Rose, Jr. | 702/3 |
| 2007/0005249 A1 | 1/2007 | Dupree et al. | |

OTHER PUBLICATIONS

West et al.; Spurious Grid-Scale Precipitation in the North American Regional Reanalysis; University of Utah, Salt Lake City, Utah; submitted to "Monthly Weather Review" Jun. 16, 2006; Revised Aug. 14, 2006; 53 pages.

* cited by examiner

*Primary Examiner* — Seyed Azarian
(74) *Attorney, Agent, or Firm* — Schmeiser, Olsen & Watts; John R. Pivnichny

(57) ABSTRACT

A method and system for automatically generating a notification of a status of precipitation being received by a user-defined detection zone within a geographic area. An image of the geographic area is received. The image includes pixels associated with the detection zone. Each pixel is associated with a sub-area of the detection zone. Characteristics (e.g., colors) of the pixels are obtained. The characteristics indicate intensities of precipitation being received by sub-areas of the detection zone. The intensities of precipitation that are greater than a first user-defined threshold are counted to produce a count. Based on the count's comparison to a second user-defined threshold, a status of precipitation being received or not being received by the detection zone is determined. A notification of the status is generated and sent.

17 Claims, 14 Drawing Sheets

```
#!/usr/bin/perl -w
# getPrecipState.pl - process WSR-88D N0 (base reflectivity) data to indicate
#                     precipitation status, such as 'raining' or 'clear'
use strict;
use GD;

die "specify file name, X pixel, Y pixel, distance, threshold " unless @ARGV == 5;
my( $fname, $pointX, $pointY, $distance, $threshold ) = @ARGV;

my %colorList =( "2,253,2"         => "lightGreen 20DBZ",
                 "1,197,1"         => "mediumGreen 25DBZ",
                 "0,142,0"         => "darkGreen 30DBZ",
                 "253,248,2"       => "lightYellow 35DBZ",
                 "229,188,0"       => "mediumYellow 40DBZ",
                 "253,139,0"       => "darkYellow 45DBZ",
                 "253,0,0"         => "lightRed 50DBZ",
                 "212,0,0"         => "mediumRed 55DBZ",
                 "188,0,0"         => "darkRed 60DBZ",
                 "248,0,253"       => "lightPurple 65DBZ",
                 "152,84,198"      => "mediumPurple 70DBZ",
                 "253,253,253"     => "takeCover! 75DBZ" );

my $radarMap = newFromGif GD::Image( "$fname" ) || die "bad image file $fname";
```

```
my $startCol = $pointX - ($distance/2);
my $startRow = $pointY - ($distance/2);
my $endCol   = $pointX + ($distance/2);
my $endRow   = $pointY + ($distance/2);

my $colN = $startCol;
my $precipCount = 0;

while( $colN <= $endCol )
{
    my $rowN = $startRow;
    while($rowN <= $endRow )
    {
        my $index = $radarMap->getPixel( $colN, $rowN );
        my( $r, $g, $b ) = $radarMap->rgb($index);
        if( exists( $colorList{"$r,$g,$b"} ) )
        {
            $precipCount++;
            if( $precipCount >= $threshold ){ $colN = 700; $rowN = 700 }
        }
        $rowN++;
    }#column $colN++;
}#row if( $precipCount >= $threshold )
{
    print "$fname is raining\n";
}
else
{
    print "$fname is clear \n";
}
```

```perl
#!/usr/bin/perl -w
# stateMon.pl - simple monitoring of precipitation state
use strict;
my %cmdHash = ();
my $initialState = "null";
eval
{
    open(STATE,notify.state) or die "could not open state file";
    $initialState = <STATE>;
    close(STATE);
};

if( $@ =~ /could not open state file/ )
{
    open (STATE,">notify.state") or die "can't open state file for writing";
        print STATE "null";
    close(STATE)
}#file not found error open(CFG,notify.config) or die "can't open notification configuration";
while(<CFG>)
{
    my( $keyword, $command ) = split " ##";
        $cmdHash{$keyword} = $command;
}
close(CFG);
```

```
while(my $status = <STDIN>)
{
    open(STATE,">notify.state") or die "can't open state file for writing";
    print STATE "$status";
    close(STATE);

for my $keyword ( keys %cmdHash )
    {
        if( $status =~ /$keyword/i )
        {
            last if( $initialstate eq "null" );
            if( $initialstate !~ /$status/i )
            {
                my $cmd = `$cmdHash{$keyword}`;
            }#if status is not initial state
        }#if status and keyword match
    }#for each keyword }#while stdin
```

AUTOMATICALLY GENERATING PRECIPITATION PROXIMITY NOTIFICATIONS

FIELD OF THE INVENTION

The present invention relates to a data processing system and method for automatically generating notifications of a current status of precipitation events, and more particularly to a technique for automatically generating the aforementioned notifications in a user-defined geographic area using base reflectivity radar data.

BACKGROUND OF THE INVENTION

Conventional networked precipitation gauges provide a limited geographic area of coverage and provide reliable notifications only to a location centered between the various gauges. This known networked gauge technique requires time-intensive and expensive deployment of precipitation gauges, customized networking and data aggregation setups to effectively record precipitation. The power and maintenance needs of such networked gauge techniques are also expensive. Furthermore, known radar-based solutions provide broad-level (i.e., 40+square mile resolution) detail on tracking storm systems (e.g., a public media or governmental organization's county-wide severe weather notification system) that are designed to satisfy information needs of a wide audience of viewers rather than a single user. Thus, there exists a need to overcome at least one of the preceding deficiencies and limitations of the related art.

SUMMARY OF THE INVENTION

The present invention provides a computer-implemented method of generating a notification of a status of precipitation being received by an area, comprising:

receiving, by a computing system, an image of a geographic area, wherein the image includes a plurality of pixels, wherein the plurality of pixels includes a set of pixels associated with a detection zone within the geographic area, wherein each pixel of the set of pixels is associated with a sub-area of a plurality of sub-areas of the detection zone, and wherein the detection zone is predefined by a user of the computing system;

obtaining, by a computing system, a set of characteristics of the set of pixels, wherein each pixel of the set of pixels has a characteristic of the set of characteristics, and wherein the set of characteristics indicates a set of intensities of precipitation being received by the plurality of sub-areas of the detection zone;

counting, by the computing system, one or more intensities of the set of intensities, wherein each of the one or more intensities is greater than a per-pixel precipitation quantity threshold, and wherein the counting results in a count;

determining, by the computing system and based on the count, a status of a precipitation event, wherein the status indicates precipitation is being received by the detection zone or the precipitation is not being received by the detection zone; and generating, by the computing system, a notification of the status.

A system, computer program product, and a process for supporting computing infrastructure that provides at least one support service corresponding to the above-summarized method are also described and claimed herein.

Advantageously, the present invention employs publicly available and globally accessible radar images to provide automatic notifications of changes in precipitation status in a user-defined detection zone that includes a user-defined location. Further, the user-defined detection zone may be as small as approximately one square mile in area.

BRIEF DESCRIPTION OF THE DRAWINGS

FIGS. 5A-5B depict exemplary code for obtaining a precipitation status in the process of FIGS. 2A-2B, in accordance with embodiments of the present invention.

FIGS. 5C-5D depict exemplary code for monitoring precipitation status and generating notifications in the process of FIGS. 2A-2B, in accordance with embodiments of the present invention.

DETAILED DESCRIPTION OF THE INVENTION

Overview

The present invention processes a precipitation image, disambiguates false positive indications of precipitation in the precipitation image, and sends a notification of a current status of precipitation (a.k.a., precipitation status) in a precise, user-defined proximity to a user-defined location. In one embodiment, the precipitation image processed by the present invention is a publicly available image that is derived from radar data. One example of radar data that may be transformed into the precipitation image is base reflectivity radar data that is distributed over the Internet by the National Weather Service (NWS) of the National Oceanic and Atmospheric Administration (NOAA) and that originates from a ground-based Weather Surveillance Radar 88 Doppler (WSR-88D) radar system. The aforementioned notification of the current status of precipitation is also referred to herein as a precipitation proximity notification. A precipitation proximity notification can be used, for example, to facilitate a user's decision to take action to avoid or minimize the effects of rainfall (e.g., cancel an outdoor concert, go outside to where a convertible car is parked to put its top up, or run to a car in a period of rain that has diminished in intensity so the user avoids getting drenched). It should be noted that the present invention is not a technique for predicting precipitation; rather, the present invention provides a current status of precipitation for a precise, user-defined area.

Precipitation Proximity Notification System

Figure 1:
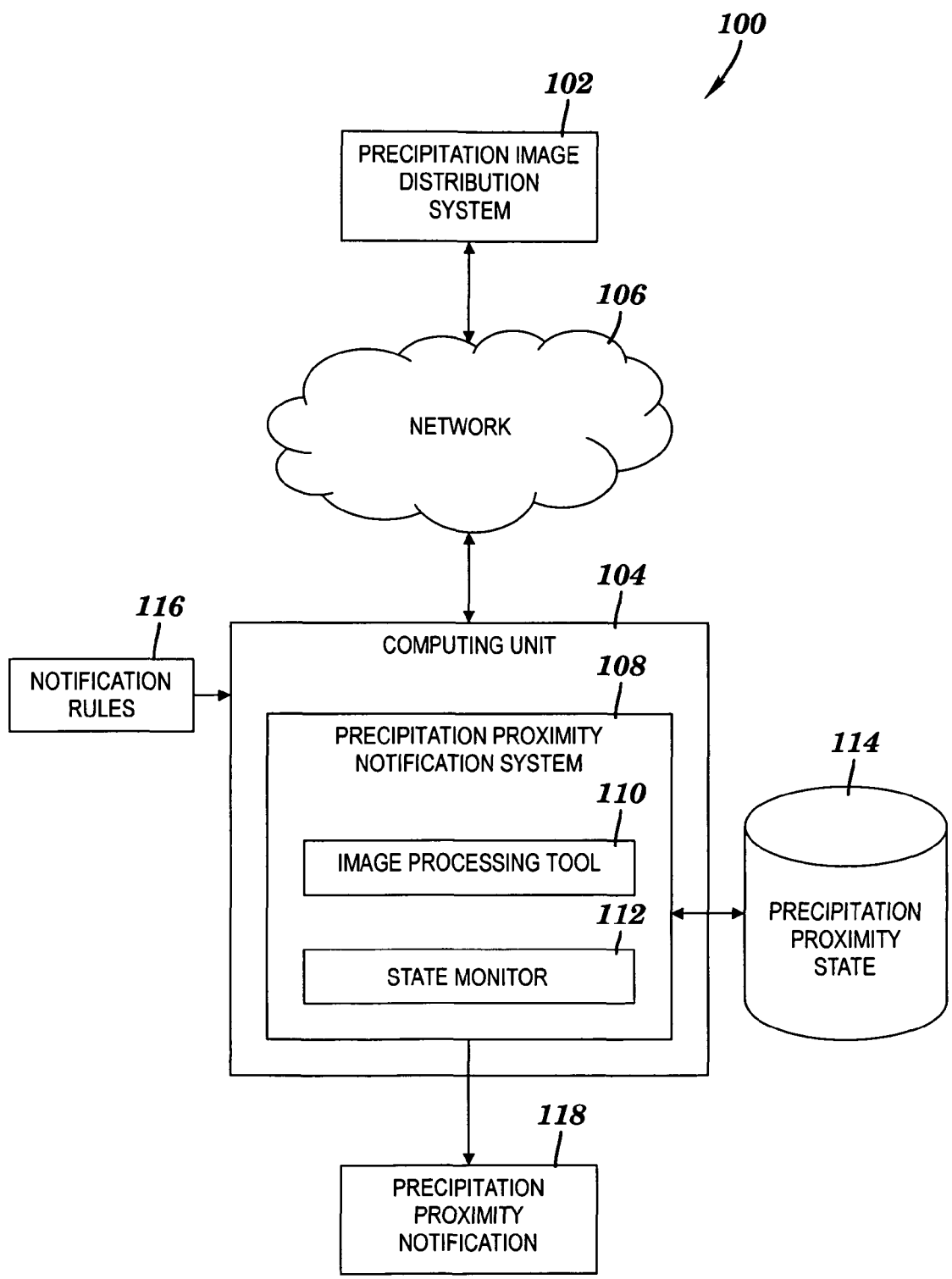
FIG. 1 is a block diagram of a system for automatically generating precipitation proximity notifications, in accordance with embodiments of the present invention.

FIG. 1 is a block diagram of a system for automatically generating precipitation proximity notifications, in accordance with embodiments of the present invention. System 100 includes a precipitation image distribution system 102 and a computing unit 104 that communicate via a network 106 (e.g., the Internet). Computing unit 104 includes a precipitation proximity notification system 108, which includes an image processing tool 110 and a state monitor 112. System 100 also includes a precipitation proximity state data repository 114 that stores one or more precipitation statuses generated by precipitation proximity notification system 108. In another embodiment, repository 114 is a data file (e.g., text file) included in computing unit 104. Furthermore, system 100 includes notification rules 116 that may be input into computing unit 104. In an alternate embodiment, notification rules may be coded within the precipitation proximity notification system 108. Finally, system 100 includes a precipitation proximity notification 118 that is output by precipitation proximity notification system 108. The type of precipitation proximity notification 118 is based on notification rules 116. Further details regarding the functionality of the above-described components of system 100 are discussed below relative to FIGS. 2A-2B.

Computing unit 104 is, for example, a smartphone or a personal computer. To monitor a single detection zone, computing unit 104 may be a personal computer having a Pentium® II or later microprocessor. Precipitation image distribution system 102 is provided by, for example, the website of NOAA, which distributes base reflectivity radar images. An example of a software implementation of image processing tool 110 is shown in FIGS. 5A-5B. An example of a software implementation of state monitor 112 is shown in FIGS. 5C-5D.

Although not shown in FIG. 1, in one embodiment, an image compositing software tool (e.g., GNU Image Manipulation Program (GIMP) offered by the Free Software Foundation located in Boston, Mass.) is included in system 100 to generate a geophysical map corresponding to the precipitation image's environment, thereby allowing a user to select a set of pixel coordinates specifying a location (e.g., the user's location).

Generating Precipitation Proximity Notifications

Figure 2A:
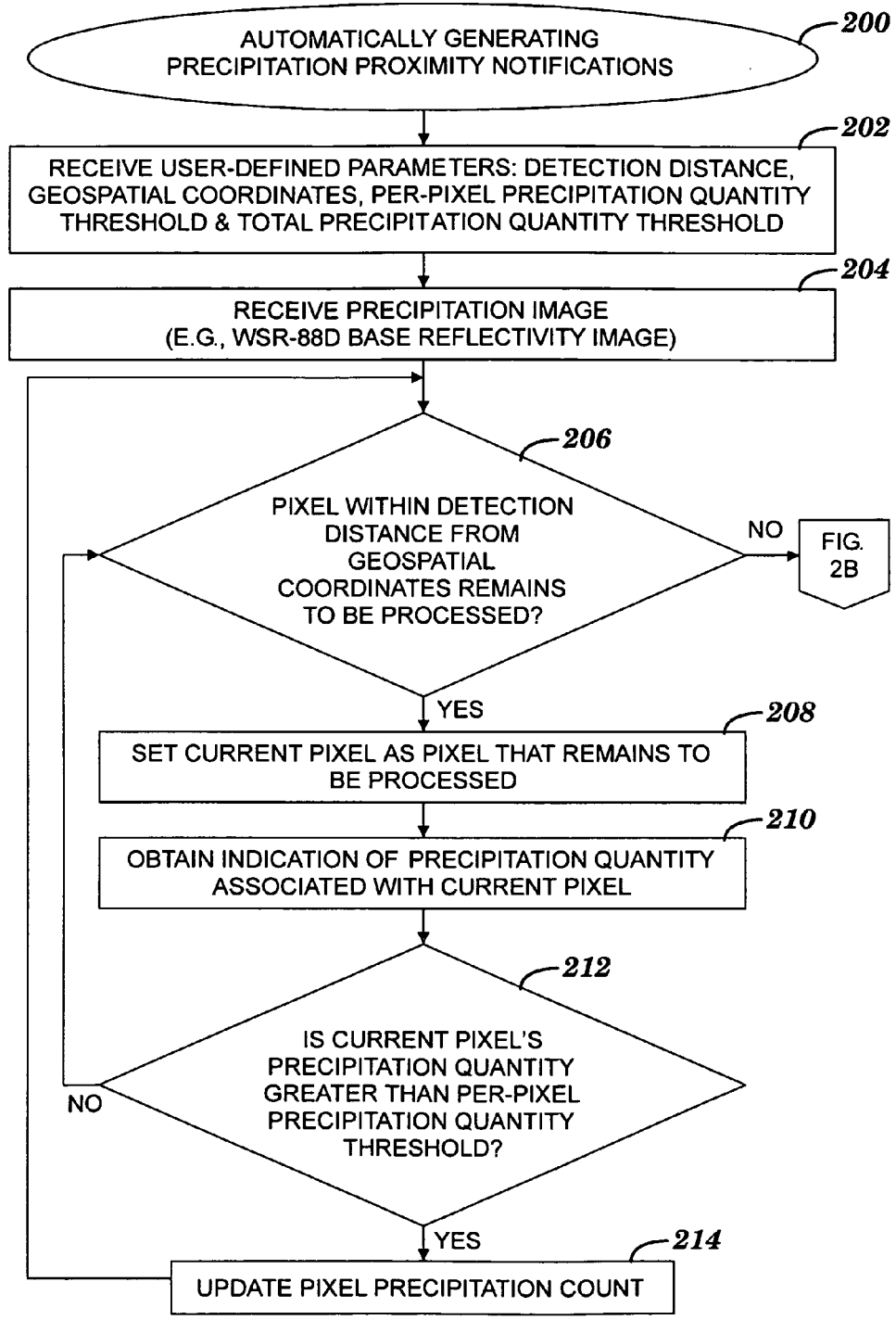
FIGS. 2A-2B depict a flow diagram of a precipitation proximity notification generation process implemented by the system of FIG. 1, in accordance with embodiments of the present invention.
Figure 2B:
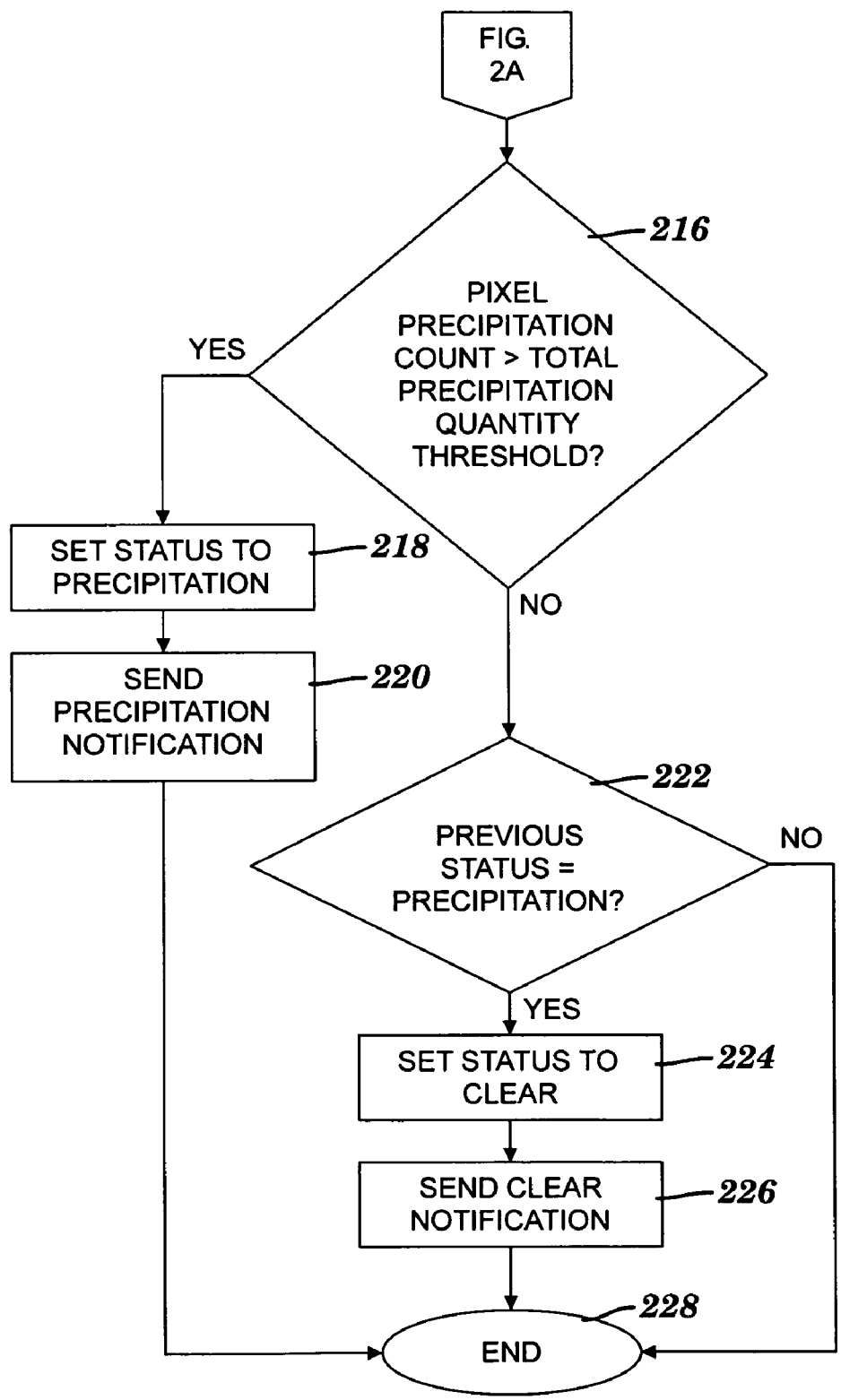

FIGS. 2A-2B depict a flow diagram of a precipitation proximity notification generation process implemented by the system of FIG. 1, in accordance with embodiments of the present invention. The automatic generation of a precipitation proximity notification starts at step 200. In step 202, computing unit 104 (see FIG. 1) receives user-defined parameters that include: detection distance, geospatial coordinates of a location of interest (e.g., the location of the user or another location in which the user is interested), per-pixel precipitation quantity threshold, and total precipitation quantity threshold. In one embodiment, step 202 may also include computing unit 104 (see FIG. 1) receiving notification rules 116 (see FIG. 1).

In one embodiment, before being able to specify geospatial coordinates that are received in step 202, a user downloads one or more layers of a radar image (e.g., a base reflectivity radar image provided by NOAA's website) that includes the location of interest. For example, the user is interested in a location in central North Carolina and downloads the topographical, highways and county layers of a base reflectivity radar image that includes central North Carolina. After the downloading of the layers is completed, the user may utilize an image compositing tool (e.g., GIMP) to combine the one or more downloaded layers for the location of interest. For example, the user applies the downloaded layers in GIMP in the following order: topographical, county, and highways to generate a map. Using a zoom feature of the image compositing tool, the user may utilize a pointing device to identify the location of interest precisely and the image compositing tool may provide a set of pixel coordinates that correspond to the location of interest. The pixel coordinates are, for example, the geospatial coordinates received in step 202.

The detection distance received in step 202 is used to derive a detection zone associated with (e.g., centered at) the geospatial coordinates received in step 202. The detection distance is, for example, a number used to derive the number of pixels comprising the length and width of a square-shaped detection zone within a radar image, where the present invention monitors a precipitation status for the detection zone. In another example, the detection zone may be a non-square shape whose dimensions are based on the detection distance (e.g., the detection zone is approximately a circle whose diameter has a number of pixels that is a function of the detection distance).

The size of the detection zone is user-defined, determined by the detection distance in relation to the geospatial coordinates, and may be as small as approximately 0.25 square miles if the precipitation image (see step 204 described below) is derived from base reflectivity radar data provided by NOAA. The detection zone's maximum size is limited by the geographic area covered by the precipitation image (see step 204).

Because the detection zone includes the immediate area completely around the location of interest identified by the geospatial coordinates, the present invention allows for precipitation front movement from any direction. The omni-directionality of detecting precipitation in the present invention ensures the capability of detecting precipitation gaps in a developing storm system.

The functionality of the per-pixel precipitation quantity and total precipitation quantity thresholds is described below.

In step 204, computing unit 104 (see FIG. 1) receives a precipitation image from precipitation image distribution system 102 (see FIG. 1) via network 106. The precipitation image received in step 204 is, for example, a WSR-88D base reflectivity image that is made available to the public via a website of NOAA. The precipitation image received in step 204 provides precipitation data over a geographic area of a surface (e.g., the earth's surface). The received precipitation image includes a plurality of pixels, where each pixel is associated with a portion of the geographic area covered by the precipitation image. A pixel in a base reflectivity radar image provided by NOAA is associated with an approximately square portion of area measuring approximately 0.5 miles on a side (i.e., 0.25 square miles).

A set of pixels included in the plurality of pixels overlaps (i.e., overlays, is superimposed upon, covers, or is otherwise correlated to) a representation of the detection zone that is defined by the user-defined detection distance and user-defined geospatial coordinates. Each pixel of the set of pixels overlaps (i.e., overlays, is superimposed upon, covers or is otherwise correlated to) a representation of a sub-area of a plurality of sub-areas of the detection zone. Hereinafter, the aforementioned set of pixels that overlaps a representation of the detection zone is also referred to as the set of pixels associated with the detection zone. Hereinafter, a pixel that overlaps a representation of a sub-area of the detection zone is also referred to as the pixel associated with the sub-area of the detection zone.

In one embodiment, a characteristic (e.g., color or pattern) of each pixel indicates an echo intensity (i.e., reflectivity) measured in decibels of Z (dBZ), where Z represents the transmitted power reflected back to the radar receiver. The dBZ measurements increase as the strength of the signal returned to the radar receiver increases. A dBZ measurement associated with a pixel of the precipitation image received in step 204 is related to the intensity of precipitation (e.g., rainfall per hour) being received by the portion of the geographic area that is associated with the pixel, For example, a medium green pixel in a WSR-88D base reflectivity radar image received in step 204 indicates a 30 dBZ measurement, which can be converted to a rainfall rate using the Marshall-Palmer relation. As one example, given one set of factors related to the type of precipitation (e.g., stratiform rain), the rainfall rate corresponding to a 30 dBZ measurement is 0.10 inches/hour. The intensity of precipitation that is related to a dBZ measurement is also referred to herein as a level of precipitation, a precipitation level or a precipitation quantity. As a dBZ measurement increases, the intensity of the precipitation associated with the measurement increases.

Due to the presence of birds, insects, buildings, airplanes and the like, base reflectivity data (e.g., measured in a WSR-88D radar station's clear air mode) can incorrectly indicate light precipitation (e.g., 0-15 dBZ) over an area that actually is clear of precipitation. Such incorrect radar data provides a false positive indication of precipitation. The present invention can compensate for such false positives via the user-defined per-pixel precipitation quantity threshold received in step 202. Any dBZ measurement greater than the per-pixel precipitation quantity threshold indicates a trackable precipitation event that is not caused by a false positive (i.e., a valid precipitation event) (see step 212 described below). For example, a user-defined setting of the per-pixel precipitation quantity threshold can consider any pixel that is green, yellow or red to be an indication of a valid precipitation event.

If image processing tool 110 (see FIG. 1) of precipitation proximity notification system 108 (see FIG. 1) determines in step 206 that a pixel in the image received in step 204 is within the detection distance received in step 202 and has not yet been processed by the subsequent steps of the process of FIGS. 2A-2B, then the Yes branch of step 206 is followed and step 208 is the next step. In step 208, image processing tool 110 (see FIG. 1) sets a current pixel as the pixel that step 206 determined as being not yet processed.

In step 210, image processing tool 110 (see FIG. 1) obtains a characteristic (e.g., color or pattern) of the current pixel, where the characteristic indicates an intensity of precipitation associated with the current pixel (i.e., the intensity of precipitation being received by a sub-area of the detection zone, where the current pixel overlaps a representation of the sub-area). For example, image processing tool 110 (see FIG. 1) obtains an indication of a color of the current pixel and a dBZ level associated with the color of the current pixel, thereby obtaining an intensity of precipitation that is associated with the obtained dBZ level.

If image processing tool 110 (see FIG. 1) determines in step 212 that the intensity of precipitation associated with the current pixel is greater than the per-pixel precipitation quantity threshold received in step 202, then the Yes branch of step 212 is followed and step 214 is the next step. In an alternate embodiment, the Yes branch of step 212 is followed if the intensity of precipitation associated with the current pixel is greater than or equal to the per-pixel precipitation quantity threshold.

In one embodiment, the per-pixel precipitation quantity threshold is pre-defined to be a maximum reflectivity measurement (e.g., 15 dBZ or the medium blue color of the WSR-88D base reflectivity radar images provided by NOAA) associated with the aforementioned false positives to prevent the false positives from being processed as indications of actual precipitation. In another embodiment, the per-pixel precipitation quantity threshold is pre-defined to be even higher than the intensities associated with false positives because the user is interested in substantially greater levels of precipitation. For example, the per-pixel precipitation quantity threshold is pre-defined to be 20 dBZ (i.e., a light green color in the WSR-88D base reflectivity radar image) so that only moderate precipitation intensities or greater are processed by subsequent steps of the process of FIGS. 2A-2B. If the user is interested in only heavy precipitation intensities, then the per-pixel precipitation quantity threshold is pre-defined to be, for example, 45 dBZ.

In step 214, image processing tool 110 (see FIG. 1) updates a pixel precipitation count. The pixel precipitation count is a running count of the number of pixels that are associated with an intensity of precipitation greater than the per-pixel precipitation quantity threshold and that have been processed by step 210. Following step 214, the process of FIGS. 2A-2B repeats starting with inquiry step 206, which determines if any other pixel within the detection distance from the geospatial coordinates remains to be processed by step 210.

Returning to step 212, if image processing tool 110 (see FIG. 1) determines that the intensity of precipitation associated with the current pixel is not greater than the per-pixel precipitation quantity threshold, then the No branch of step 212 is taken and the process of FIGS. 2A-2B repeats starting at step 206. In an alternate embodiment, the No branch of step 212 is taken and the process repeats starting at step 206 if the intensity of precipitation associated with the current pixel is determined to be less than the per-pixel precipitation quantity threshold.

Returning to step 206, if image processing tool 110 (see FIG. 1) determines that no pixel with the detection distance from the geospatial coordinates remains to be processed, then the No branch of step 206 is taken and the process continues with step 216 of FIG. 2B.

If image processing tool 110 (see FIG. 1) determines in step 216 of FIG. 2B that the pixel precipitation count is greater than the total precipitation quantity threshold received in step 202 (see FIG. 2A), then the Yes branch of step 216 is followed and the next step is step 218. In an alternate embodiment, the Yes branch of step 216 is taken if the pixel precipitation count is determined to be greater than or equal to the total precipitation quantity threshold.

In step 218, image processing tool 110 (see FIG. 1) sets a precipitation proximity status to indicate that precipitation is in the detection zone defined by the detection distance and geospatial coordinates. In step 218, the state monitor 112 (see FIG. 1) of precipitation proximity notification system 108 (see FIG. 1) stores the precipitation proximity status in precipitation proximity state repository 114 (see FIG. 1). In step 220, state monitor 112 (see FIG. 1) automatically generates and automatically sends the precipitation proximity notification 118 (see FIG. 1), which indicates the current status of precipitation in the detection zone. Step 220 may include sending the precipitation proximity notification 118 (see FIG. 1) to a computing unit, which may be computing unit 104 (see FIG. 1) or another computing unit. The computing unit that receives the precipitation proximity notification 118 (see FIG. 1) may display a notification of the current precipitation status onscreen and/or present another sensory cue (e.g., an audible cue) that indicates the current precipitation status.

Returning to step 216, if image processing tool 110 (see FIG. 1) determines that the pixel precipitation count is not greater than the total precipitation quantity threshold, then the No branch of step 216 is taken and the next step is step 222. In an alternate embodiment, the No branch of step 216 is taken and the next step is step 222 if the pixel precipitation count is determined to be less than the total precipitation quantity threshold.

If image processing tool 110 (see FIG. 1) determines in step 222 that the precipitation proximity status stored in precipitation proximity state repository 114 (see FIG. 1) (i.e., the previous precipitation proximity status) indicates a status of precipitation in the detection zone, then the Yes branch of step 222 is taken and the next step is step 224.

In step 224, image processing tool 110 (see FIG. 1) sets a precipitation proximity status to indicate that the weather in the detection zone is currently clear of precipitation (i.e., sets a clear status). In step 224, state monitor 112 (see FIG. 1) of precipitation proximity notification system 108 (see FIG. 1) stores the clear status in precipitation proximity state repository 114 (see FIG. 1). In step 226, state monitor 112 (see FIG. 1) generates and sends the precipitation proximity notification 118 (see FIG. 1), which indicates the current clear status (i.e., no precipitation) in the detection zone. Step 226 may include sending the precipitation proximity notification 118 (see FIG. 1) to a computing unit, which may be computing unit 104 (see FIG. 1) or another computing unit. The computing unit that receives the precipitation proximity notification 118 (see FIG. 1) may display a notification of the current clear status onscreen and/or present another sensory cue (e.g., an audible cue) that indicates the current clear status. Following step 226, step 220 and the No branch of step 222, the process of FIGS. 2A-2B ends at step 228.

In one embodiment, the process of FIGS. 2A-2B is repeated to provide a continuous monitoring of changes in the precipitation status associated with the detection zone over a user-defined time period. The frequency in which new precipitation images are available for processing depends on the scan rates of the radar system being used and how quickly the raw radar data is made available via precipitation image distribution system 102 (see FIG. 1). For example, WSR-88D radar is operated in one of two modes: clear air mode or precipitation mode. In clear air mode, precipitation images are updated in distribution system 102 (see FIG. 1) every 10 minutes. In precipitation mode, precipitation images are updated in distribution system 102 (see FIG. 1) every four to six minutes.

In one embodiment, the precipitation notification sent in step 220 is an alert selected from a set of pre-defined levels of alerts based on notification rules 116 (see FIG. 1), where the level of the alert is based on an intensity of precipitation (e.g., light, medium or heavy) associated with the detection zone. Providing the different levels of alerts may be implemented by updating a set of sub-counts of the pixel precipitation count, where each sub-count counts the number of pixels associated with a corresponding pre-defined intensity of precipitation and the pre-defined intensity associated with the highest sub-count indicates the level of the alert.

In one embodiment, the logic of the process of FIGS. 2A-2B is extended to process multiple detection zones that may utilize the same or different per-pixel precipitation quantity thresholds and total precipitation quantity thresholds. In this embodiment, one or more additional user-defined parameters are received in step 202 (see FIG. 2A) (e.g., additional detection distance(s), additional set(s) geospatial coordinates, additional per-pixel precipitation quantity threshold(s) and/or additional total precipitation quantity threshold(s)). Other counts may be produced in this embodiment to track counts of intensities of precipitation that correspond to user-defined categories, such as light, moderate and heavy precipitation. For example, a user who is organizing an outdoor concert specifies two detection zones centered at the site of the outdoor concert. The first detection zone is defined to be an 8 mile by 8 mile square region and the second detection zone is defined to be a 5 mile by 5 mile square region. Extended logic of FIGS. 2A-2B monitors the current status of precipitation in both detection zones and sends the user a first type of notification if any rain of a light, medium or heavy intensity is being received by the first detection zone. Furthermore, the user is alerted with a second type of notification (i.e., a warning) if a heavy rainfall is detected as the precipitation status in the second detection zone. The user may use the receipt of the first type of notification to heighten awareness that the weather may affect the outdoor concert. Moreover, the user may use receipt of the second type of notification to facilitate a decision to cancel the outdoor concert.

In a first alternate embodiment, a pre-defined temporal delay is enforced before sending the notifications in steps 220 and 226. That is, if the process reaches step 220 or step 226 and a pre-defined time period since the most recent notification was sent has not elapsed, then no notification is sent in step 220 or step 226.

In a second alternate embodiment, two different total precipitation quantity thresholds (i.e., a rain threshold and a clear threshold, where rain threshold>clear threshold) are pre-defined and received in step 202 (see FIG. 2A) instead of only one, in order to prevent sending a substantially large number of alternating raining and clear notifications in a substantially small time period. In this embodiment, if the pixel precipitation count exceeds the rain threshold and the previous status is clear, then the status is changed to raining and the notification with the raining status is sent, but no change in status occurs if the pixel precipitation count varies between the clear threshold and the rain threshold. Furthermore, if the pixel precipitation count is less than or equal to the clear threshold and the previous status is raining, then the status is changed to clear and the notification with the clear status is sent, but no change in status occurs if the pixel precipitation count varies between the rain threshold and the clear threshold.

EXAMPLE

Figure 3A:
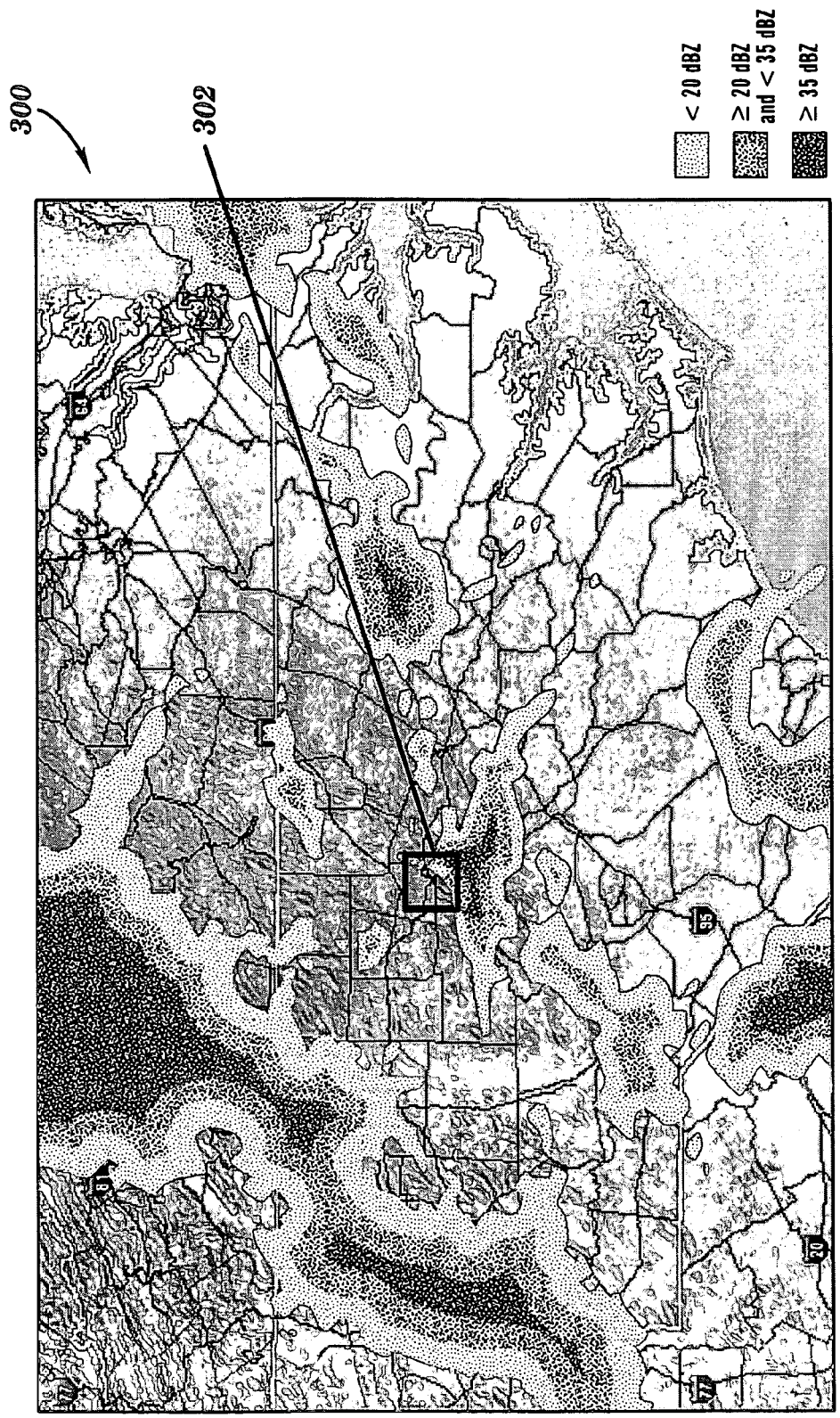
FIG. 3A-3C depict exemplary images that represent precipitation images that are received in the process of FIG. 2A, in accordance with embodiments of the present invention.
Figure 3B:
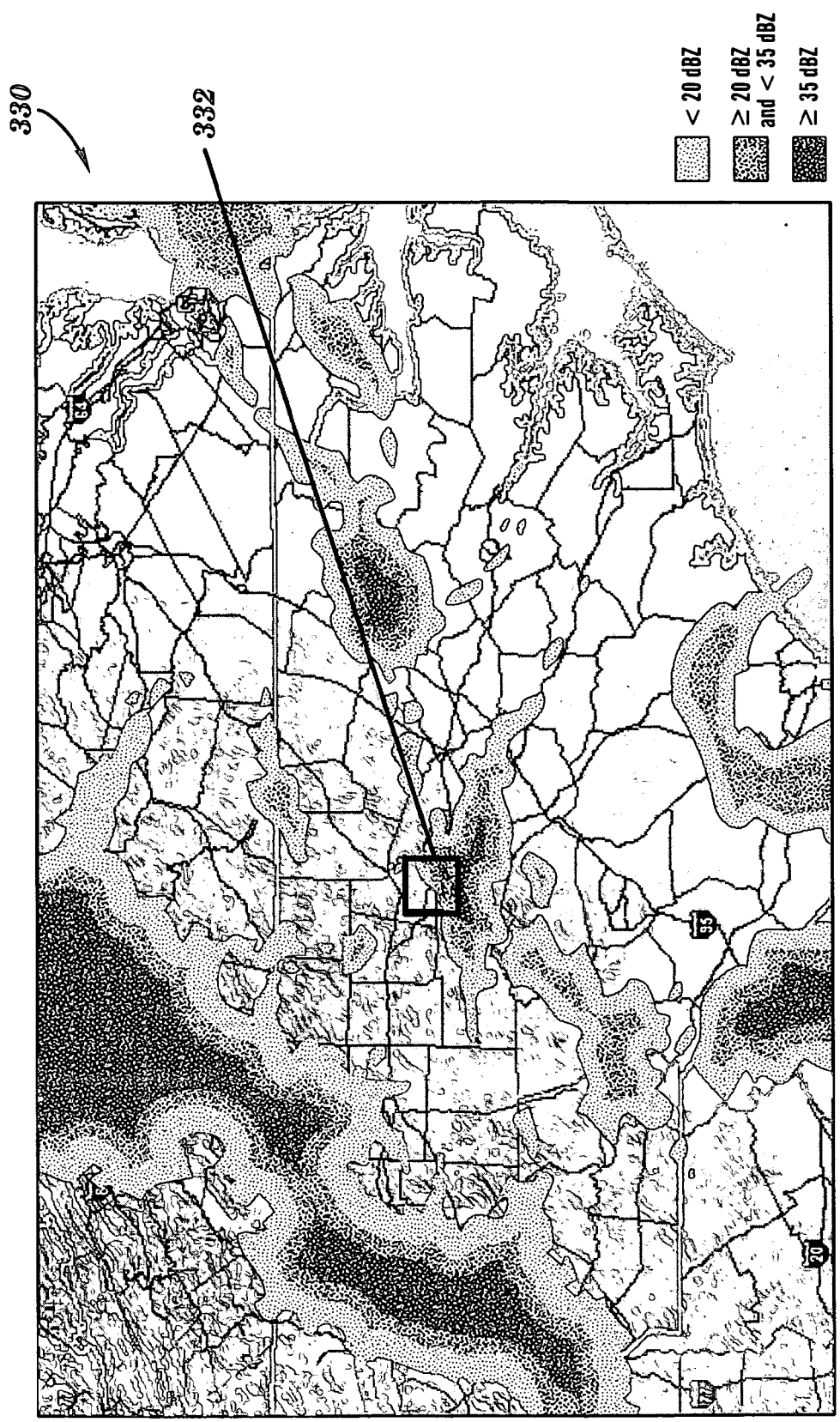
Figure 3C:
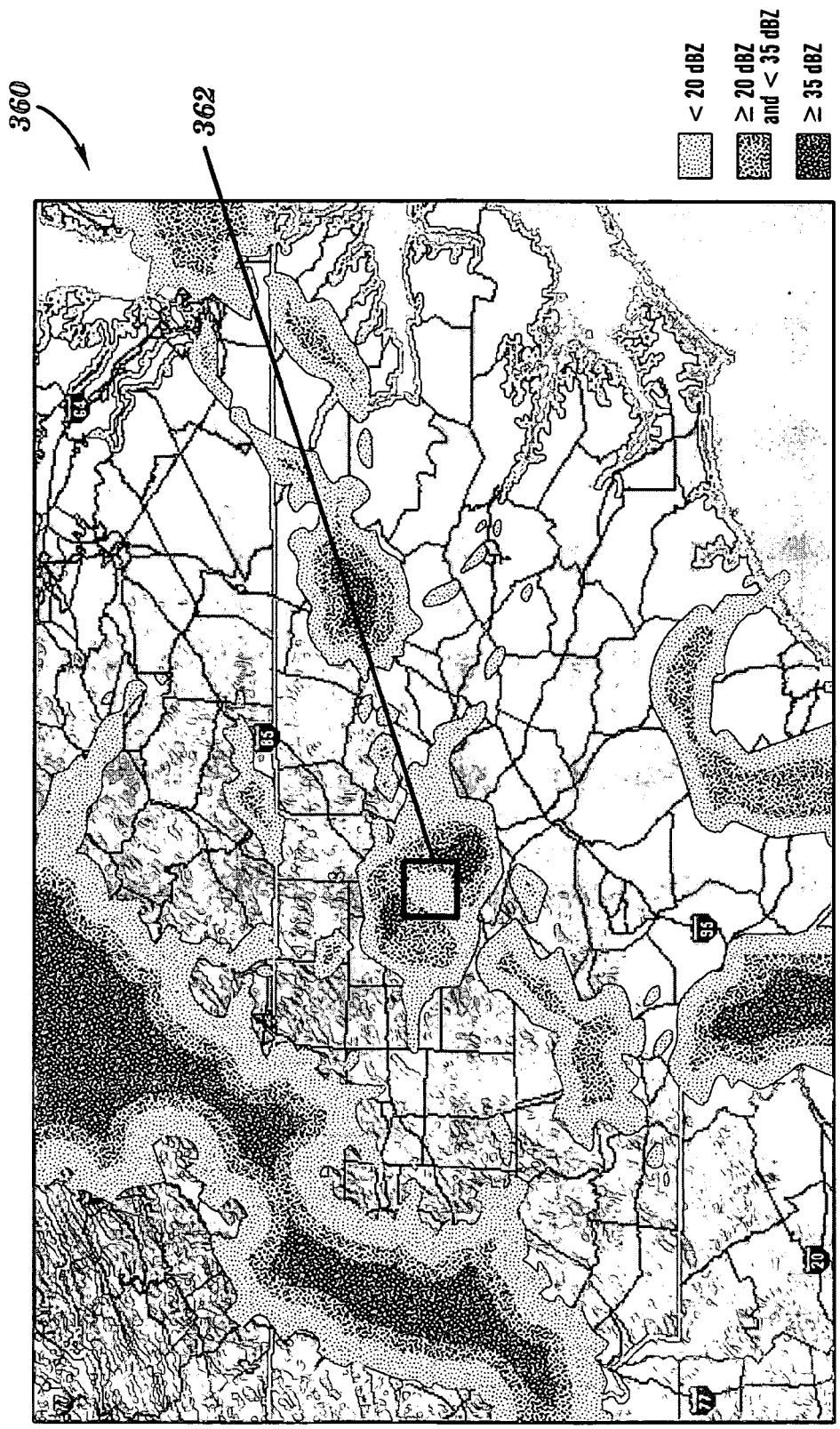

FIG. 3A-3C depict exemplary images that represent precipitation images that are received in the process of FIG. 2A, in accordance with embodiments of the present invention. In one embodiment, the precipitation images received in step 204 (see FIG. 2A) provide more granularity that the three different patterns included in the legends of FIGS. 3A-3C. For example, a precipitation image that is derived from WSR-88D radar data in precipitation mode may include up to 14 different colors (e.g., light blue, medium blue, dark blue, light green, medium green, dark green, etc.) that indicate dBZ levels from 5 dBZ to 75 dBZ.

FIG. 3A is an image 300 derived from base reflectivity radar data collected at a time T1. An area 302 is included in precipitation image 300. The geographic area indicated by area 302 includes a detection zone (not shown) defined by the pre-defined detection distance and predefined geospatial coordinates received in step 202 (see FIG. 2A). FIG. 3B is a precipitation image 330 derived from base reflectivity radar data collected at a time T2, which is subsequent to time T1. An area 332 is included in precipitation image 330. The geographic area indicated by area 332 includes the detection zone mentioned above relative to FIG. 3A. FIG. 3C is a precipitation image 360 derived from base reflectivity radar data collected at a time T3, which is subsequent to time T2. An area 362 is included in precipitation image 360. The geographic area indicated by area 362 includes the detection zone mentioned above relative to FIG. 3A.

Areas 302 (see FIG. 3A), 332 (see FIG. 3B) and 362 (see FIG. 3C) indicate the same geographic region, while including different sets of data (i.e., patterns) that approximate different precipitation levels being received by the detection zone. In one embodiment, the different patterns included in areas 302 (see FIG. 3A), 332 (see FIG. 3B) and 362 (see FIG. 3C) are indicated by different colors. Taken as a sequence over time in the order T1, T2, T3, the data included in areas 302 (see FIG. 3A), 332 (see FIG. 3B) and 362 (see FIG. 3C) illustrate approximations of different levels of precipitation moving through the aforementioned geographic region.

Figure 4A:
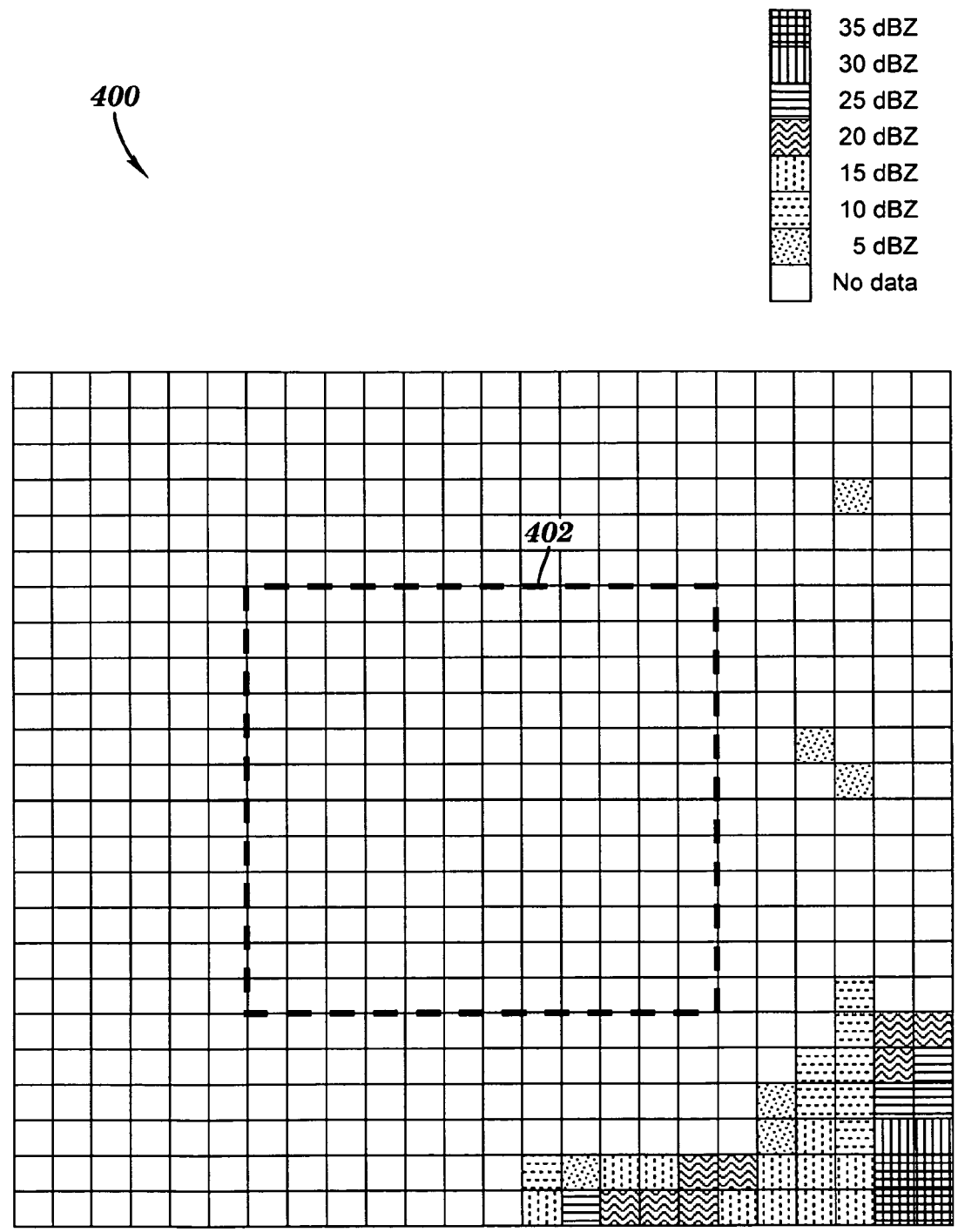
FIGS. 4A-4C depict areas that are magnified views of areas indicated in the precipitation images of FIGS. 3A-3C, respectively, in accordance with embodiments of the present invention.
Figure 4B:
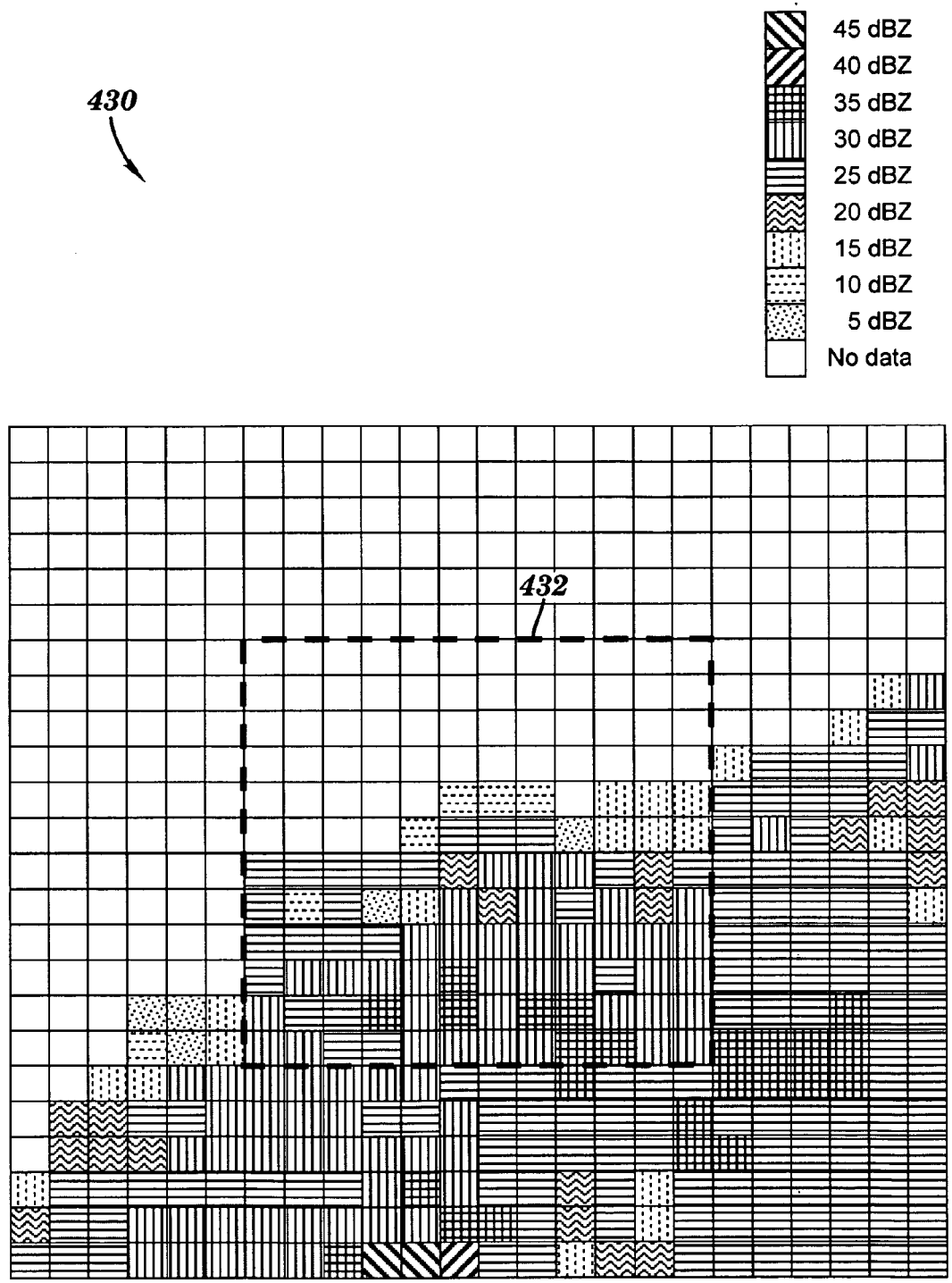
Figure 4C:
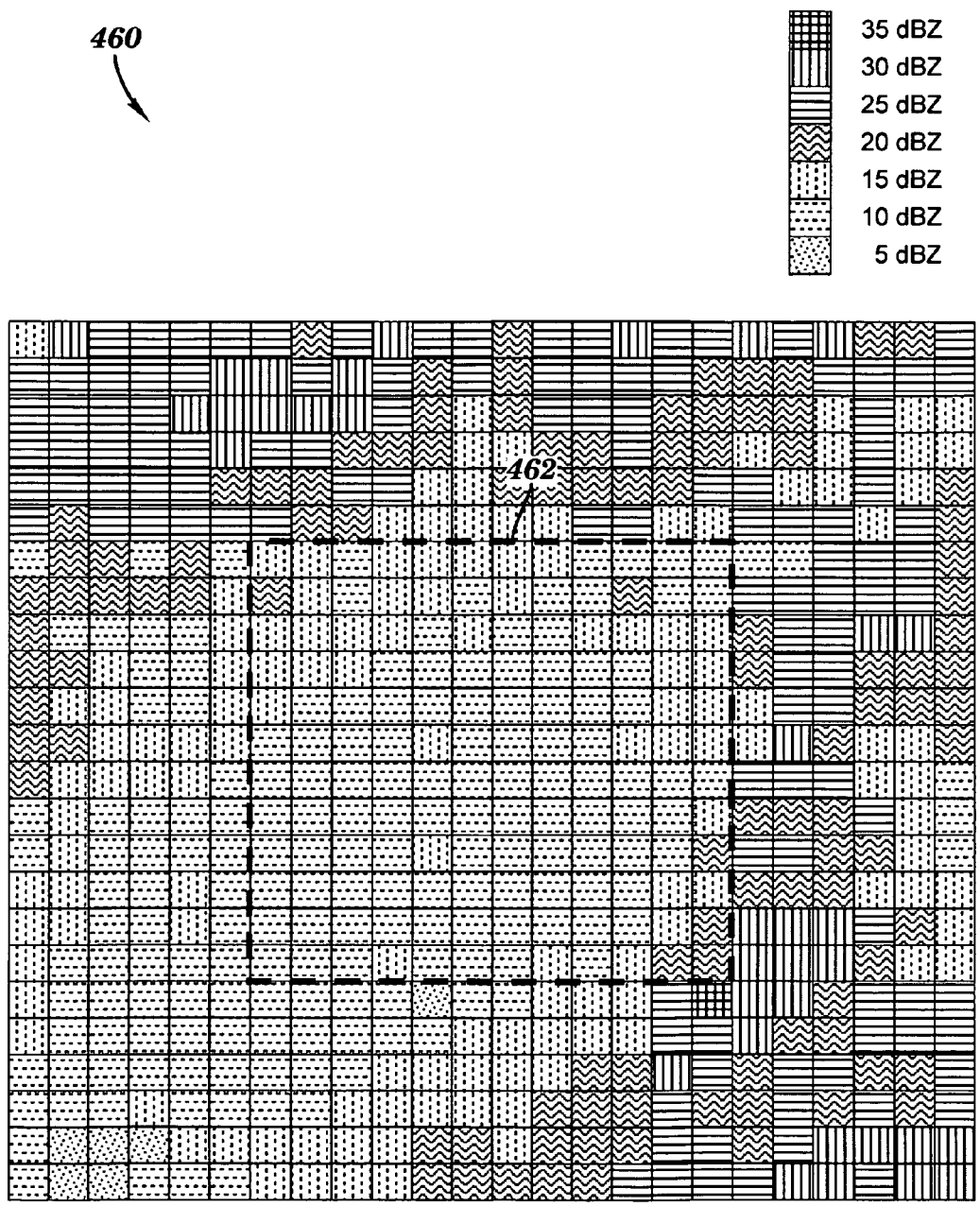

FIGS. 4A-4C depict magnified views of areas included in the precipitation images of FIGS. 3A-3C, respectively, in accordance with embodiments of the present invention. View 400 in FIG. 4A is an approximate magnified view of area 302 in FIG. 3A. Each block in view 400 is a single pixel included in a precipitation image received in step 204 (see FIG. 2A), where the precipitation image is based on radar data collected at time T1. The seven non-white patterns indicated in the legend of FIG. 4A provide a more granular view of the same radar data that is approximately represented in area 302 (see FIG. 3A). Each pattern in FIG. 4A actually represents an interval of dBZ measurements. For each pattern in the legend of FIG. 4A, the dBZ measurement that labels the pattern is the closed lower bound of an interval of dBZ measurements that has an open upper bound of a next higher dBZ value determined by the lower bound incremented by 5 dBZ (i.e., the interval [lower bound, lower bound+5)). For example, the pattern in the legend of FIG. 4A that is labeled 5 dBZ represents any dBZ measurement ≧5 dBZ and <10 dBZ. As another example, the pattern labeled 35 dBZ represents any dBZ measurement ≧35 dBZ and <40 dBZ.

A detection view 402 included in view 400 indicates a square-shaped detection zone centered at the pre-defined geospatial coordinates received in step 202 (see FIG. 2A). The length of detection view 402 is a number of pixels determined by the pre-defined detection distance received in step 202 (see FIG. 2A). The pixels of detection view 402 include no precipitation data, thereby indicating that the detection zone is clear of precipitation (i.e., is not receiving precipitation) at time T1.

View 430 in FIG. 4B is an approximate magnified view of area 332 in FIG. 3B. Each block in view 430 is a single pixel included in a precipitation image received in step 204 (see FIG. 2A), where the precipitation image is derived from radar data collected at time T2. The nine non-white patterns indicated in the legend of FIG. 4B provide a more granular view of the same radar data that is approximately represented in area 332 (see FIG. 3B). The labels in the legend of FIG. 4B represent intervals of dBZ measurements as described above relative to the legend of FIG. 4A.

A detection view 432 included in view 430 indicates the square-shaped detection zone whose location and size are determined as indicated above relative to detection view 402 (see FIG. 4A). The pixels of detection view 432 illustrate that precipitation is present in (i.e., is being received by) the detection zone indicated by detection view 432 at time T2. In this example, between time T1 and time T2, a line of precipitation entered the detection zone.

The process of FIGS. 2A-2B identifies the pixels in detection view 432 that are associated with false positive measurements. That is, step 212 of FIG. 2A does not process a pixel in detection view 432 whose pattern indicates a dBZ reading of less than 20 dBZ. Thus, only those pixels in detection view 432 whose patterns indicate a dBZ reading of greater than or equal to 20 dBZ cause the update of pixel precipitation count in step 214 (see FIG. 2A). After completing the processing of the pixels of detection view 432 in the loop of step 206 through step 212 in FIG. 2A, the final value of the pixel precipitation count is determined to be greater than the total precipitation quantity threshold in step 216 (see FIG. 2B) and a precipitation proximity notification is sent in step 220 (see FIG. 2B). The precipitation proximity notification indicates that precipitation is being received in proximity to the location identified by the pre-defined geospatial coordinates (i.e., precipitation is being received in the detection zone).

View 460 in FIG. 4C is an approximate magnified view of area 362 in FIG. 3C. Each block in view 460 is a single pixel included in a precipitation image received in step 204 (see FIG. 2A), where the precipitation image is derived from radar data collected at time T3. The seven patterns indicated in the legend of FIG. 4C provide a more granular view of the same radar data that is approximately represented in area 362 (see FIG. 3C). The labels in the legend of FIG. 4C represent intervals of dBZ measurements as described above relative to the legend of FIG. 4A.

A detection view 462 included in view 460 indicates the square-shaped detection zone whose location and size are determined as indicated above relative to detection view 402 (see FIG. 4A). The pixels of view 460 illustrate that some moderate and heavy precipitation (i.e., pixels associated with precipitation intensity measures of greater than or equal to 20 dBZ) is present outside the detection zone indicated by detection view 462, while within the detection zone, light precipitation (i.e., pixels associated with precipitation intensity measures of less than 20 dBZ) is predominantly indicated at time T3. One or more of the light precipitation readings in the detection zone may be caused by false positive readings. Heavier precipitation has changed to substantially lighter precipitation within the detection zone between time T2 and time T3, thereby indicating that a clearing of precipitation is being experienced by the detection zone at time T3.

The process of FIGS. 2A-2B identifies the pixels in detection view 462 that are associated with false positive measurements. That is, step 212 of FIG. 2A does not process a pixel in detection view 462 if the pattern of the pixel indicates a dBZ reading of less than 20 dBZ (i.e., a majority of the pixels in detection view 462). Thus, only those pixels in detection view 462 whose patterns indicate a dBZ reading of greater than or equal to 20 dBZ cause the update of the pixel precipitation count in step 214 (see FIG. 2A). After completing the processing of the pixels of detection view 462 in the loop of step 206 through step 212 in FIG. 2A, the final value of the pixel precipitation count is determined to be less than or equal to the total precipitation quantity threshold in step 216 (see FIG. 2B). A prior status of precipitation being present in the detection zone is detected in step 222 (see FIG. 2B) and a precipitation proximity notification is sent in step 226 (see FIG. 2B) that indicates that precipitation is clearing in proximity to the location of interest identified by the pre-defined geospatial coordinates.

Sample Code

FIGS. 5A-5B depict exemplary code for obtaining a precipitation status in the process of FIGS. 2A-2B, in accordance with embodiments of the present invention. The code presented in FIGS. 5A-5B is a getPrecipState.pl program that uses Perl and the GD Graphics Library to scan the dBZ measurements indicated by colors of pixels in a square-shaped detection view centered at a location indicated by the pre-defined geospatial coordinates received in step 202 (see FIG. 2A) and determine whether the precipitation status is "raining" or "clear" based on a comparison in step 216 (see FIG. 2B) between the pixel precipitation count determined in step 214 (see FIG. 2A) and the total precipitation quantity threshold received in step 202 (see FIG. 2A). Code snippet 500 of FIG. 5A ensures that the getPrecipState.pl program has the correct number of variables to process. After defining a simple hash of the dBZ measurements and pixel colors considered to indicate valid precipitation that updates the pixel precipitation count, the precipitation image is loaded from disk. In the colorList hash of colors shown in code snippet 500, valid precipitation is considered to be any dBZ measurement associated with light green (i.e., >20 dBZ and <25 dBZ) or a higher dBZ measurement. Thus, the per-pixel precipitation quantity threshold received in step 202 (see FIG. 2A) is the lowest dBZ level that is indicated by the colorList hash (i.e., 20 dBZ). If a different per-pixel precipitation quantity threshold is received by precipitation proximity notification system 108 (see FIG. 1) to reflect a user's desire for only stronger reflectivity measures to update the pixel precipitation count, then code snippet 500 is modified to remove, for example, the green and yellow colors from the colorList hash.

Code snippet 510 in FIG. 5B sets up a square-shaped detection area bounded by the startCol, endCol, startRow and endRow variables. The two while loops in code snippet 510 scan the detection view to identify pixels having colors that match the colors specified in the colorList hash variable in code snippet 500 (see FIG. 5A). Pixels having such colors are referred to hereinafter as precipitation pixels. A running count of the identified precipitation pixels is updated in precipCount (see step 214 of FIG. 2A). If the number of identified precipitation pixels in the running count exceeds the threshold parameter (i.e., the total precipitation quantity threshold received in step 202 of FIG. 2A), then the while loops are exited and a notification with a "raining" status is outputted (see step 220 of FIG. 2B). If the number of identified precipitation pixels in the running count does not exceed the threshold parameter after the while loops finish scanning all pixels in the detection zone, then a notification with a "clear" status is outputted (see step 226 of FIG. 2B).

The getPrecipState.pl program can be run with a command in the format: getPrecipState.pl <radar_image> <X coord> <Y coord> <distance> <threshold>, where <X coord>, <Y coord> are the geospatial coordinates received in step 202 of FIG. 2A, <distance> is the detection distance received in step 202 of FIG. 2A, and <threshold> is the total precipitation quantity threshold received in step 202 of FIG. 2A. As one example, the command perl getPrecipState.pl RAX_N0R_0.gif 263 258 10 40 downloads a base reflectivity radar image from NOAA's central North Carolina WSR-88D radar station and obtains the precipitation state in an 11 by 11 pixel detection view (i.e., corresponding to a square-shaped detection zone of approximately 30 square miles) centered at the geospatial location coordinates of 263, 258, where the precipitation status is based on detecting precipitation pixels in the detection zone that are associated with precipitation levels greater than or equal to the lowest dBZ level in the colorList hash (i.e., 20 dBZ), and where the precipitation status is "raining" if the number of precipitation pixels is greater than 40 (i.e., the threshold parameter). The 11 by 11 pixel detection view is a square determined by extending distance/2 pixels (i.e., 10/2 or 5 pixels) in opposing horizontal directions from a center pixel identified by 263, 258, and in opposing vertical directions from the center pixel.

After obtaining the precipitation status from the code of FIGS. 5A-5B, the output status is provided to state monitor 112 (see FIG. 1) to generate a precipitation proximity notification 118 (see FIG. 1) based on notification rules 116 (see FIG. 1). For example, an email notification is desired when the precipitation status is "raining" (e.g., rain is being received by the detection zone) and an on-screen notification pop-up is desired after the precipitation status changes from "raining" to "clear" (e.g., rain has passed out of the detection zone). The following configuration file uses an email client (i.e., mutt) to send the email notification that indicates the raining status and generates a pop-up message box to a local display for 10 seconds to indicate that the rain has passed out of the detection zone:

```
raining ## mutt -s "rain proximity alert" 9197490897@
    cingularme.com < /dev/null
clear ## kdialog -passivepopup "The rain has passed" 10
```

To process such configuration options, a state monitor 112 (see FIG. 1) is needed to determine the initial precipitation status of the detection zone, monitor the detection zone for changes in the precipitation status and send the appropriate precipitation proximity notification. State monitor 112 (see FIG. 1) is, for example, the stateMonitor.pl program shown in code snippet 550 of FIG. 5C and code snippet 560 of FIG. 5D.

Code snippet 550 of FIG. 5C declares variables and attempts to load a previous configuration file from a notify.state file (i.e., precipitation proximity state repository 114 of FIG. 1). If the notify.state file does not exist, as determined by the file open error, then the "null" state is written to the notify.state file. The notify.config file is then processed to load commands to run upon each precipitation status being reached.

Code snippet 560 of FIG. 5D includes a while loop that starts by reading the precipitation status output from the getPrecipState.pl program shown in FIGS. 5A-5B. The current precipitation status is written to the notify.state file, which saves the precipitation status for the next read. Each key read from the notify.config file is then processed in a for loop. If the current precipitation status matches a key from the notify.config file as stored in the %cmdHash variable, then processing continues. If the initialState is "null" (i.e., a previous precipitation status had not been recorded), then processing exits the for loop. Otherwise, if the current precipitation status does not match the recorded precipitation status, then the specified command is run.

As one example, the stateMon.pl program starts and the notify.state file does not exist, so the notify.state file is created with the contents "null". The "clear" status has been passed in by the getPrecipState.pl program, so code snippet 550 of FIG. 5C writes "clear" into the notify.state file. The keys specified in %cmdHash are processed, but because the initialState was set to "null", the loop is exited and no commands are run. On the next pass, the stateMon.pl program reads the "clear" status from the notify.state file, and if the getPrecipState.pl program passes in a "raining" status, the appropriate notification of rain in the detection zone is sent to the specified email address.

The stateMon.pl program is used by piping the output of the getPrecipState.pl program into the stdin of stateMon.pl by, for instance, the following command:

```
perl getPrecipState.pl RAX_N0R_0.gif 263 258 10 40 | perl
    stateMon.pl
```

The getPrecipState.pl program and the notify.config notification descriptions can be modified to support any number of events, such as sending a notification in response to the detection zone receiving a high percentage of rainfall compared to surrounding areas.

The status of the statemon.pl operations (e.g., raining, clear or null) can be reset by deleting the notify.state file or changing the contents of the notify.state file manually. Such a reset allows a status detected by the present invention to be based on other factors, such as wind speed or computed cloud cover.

As one example of a configuration that implements the present invention, a command-line download tool (e.g., GNU Wget offered by the Free Software Foundation) and a scheduler (e.g., cron) are used to automatically download the WSR-88D base reflectivity precipitation image for a desired geographic area every 5 minutes. The same scheduler runs the getPrecipState.pl program with the most recent precipitation image and pipes the output of getPrecipState.pl to the statemon.pl program. Messages are then received to notify the user of the presence of precipitation in a detection zone and the clearing of the precipitation.

Extensions of the present invention include developing data on other weather-related events, such as tracking precipitation trends over a broad time range, or changing the bounding areas to provide a rain gate monitor, in order to determine, for example, if it has rained on a favorite park bench over a recent time period.

Computing System

Figure 6:
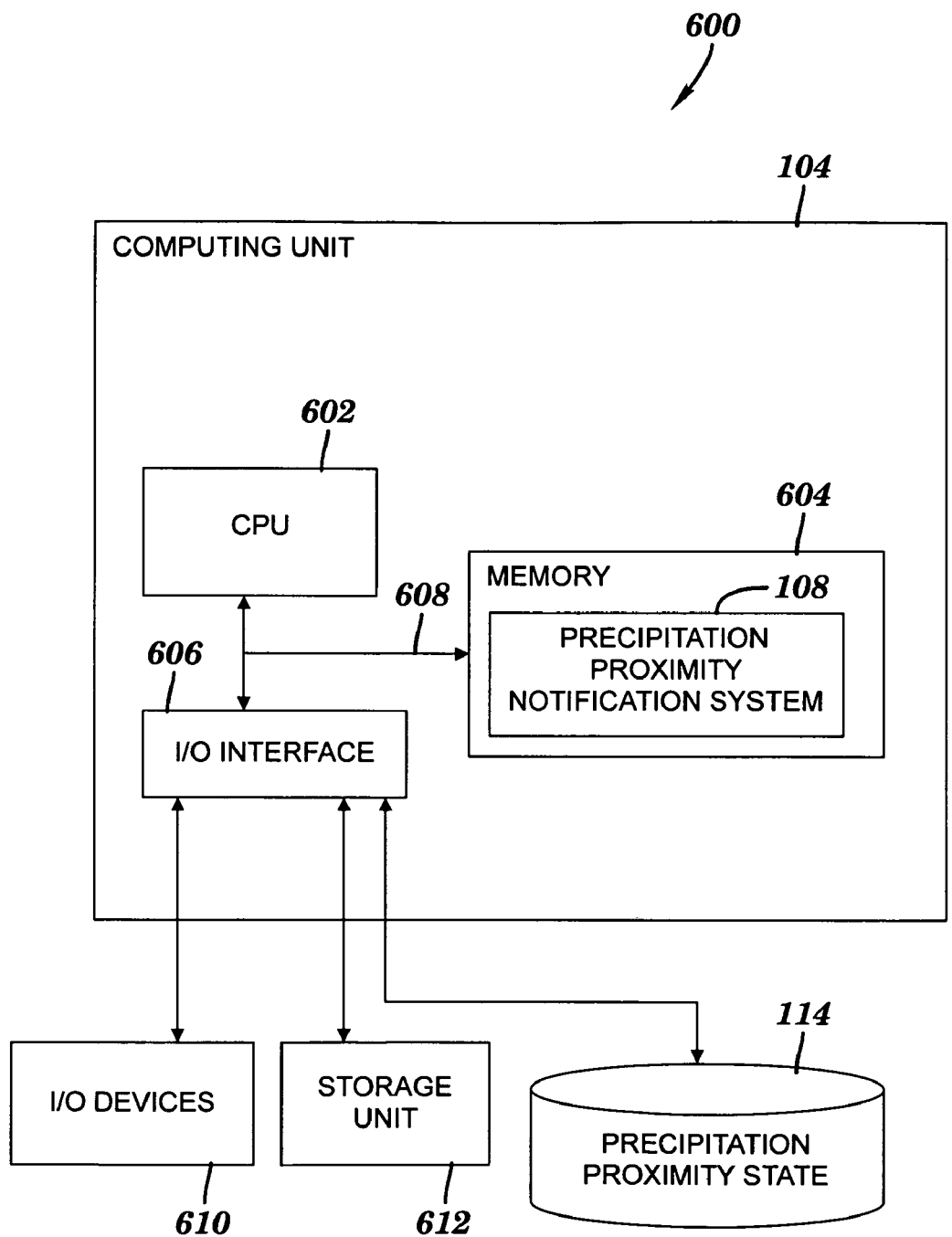
FIG. 6 is a block diagram of a computing system that is included in the system of FIG. 1 and that implements the process of FIGS. 2A-2B, in accordance with embodiments of the present invention.

FIG. 6 is a block diagram of a computing system that is included in the system of FIG. 1 and that implements the process of FIGS. 2A-2B, in accordance with embodiments of the present invention, Computing system 600 generally comprises computing unit 104 that includes central processing unit (CPU) 602, a memory 604, an input/output (I/O) interface 606, and a bus 608. Computing system also includes I/O devices 610, storage unit 612, and precipitation proximity state repository 114 coupled to computing unit 104. CPU 602 performs computation and control functions of computing system 600. CPU 602 may comprise a single processing unit, or be distributed across one or more processing units in one or more locations (e.g., on a client and server).

Memory 604 may comprise any known type of data storage and/or transmission media, including bulk storage, magnetic media, optical media, random access memory (RAM), read-only memory (ROM), a data cache, a data object, etc. Cache memory elements of memory 604 provide temporary storage of at least some program code in order to reduce the number of times code must be retrieved from bulk storage during execution. Storage unit 612 is, for example, a magnetic disk drive or an optical disk drive that stores data. Moreover, similar to CPU 602, memory 604 may reside at a single physical location, comprising one or more types of data storage, or be distributed across a plurality of physical systems in various forms. Further, memory 604 can include data distributed across, for example, a LAN, WAN or storage area network (SAN) (not shown).

I/O interface 606 comprises any system for exchanging information to or from an external source. I/O devices 610 comprise any known type of external device, including but not limited to a display monitor, keyboard, pointing device, speakers, handheld device, printer, facsimile, etc. I/O devices can be coupled to computing unit 104 directly or through I/O interface 606. Bus 608 provides a communication link between each of the components in computing unit 104, and may comprise any type of transmission link, including electrical, optical, wireless, etc.

I/O interface 606 also allows computing unit 104 to store and retrieve information (e.g., program instructions or data) from an auxiliary storage device (e.g., storage unit 612). The auxiliary storage device may be a non-volatile storage device (e.g., a CD-ROM drive which receives a CD-ROM disk). Computing unit 104 can store and retrieve information from other auxiliary storage devices (not shown), which can include a direct access storage device (DASD) (e.g., hard disk), a magneto-optical disk drive, a tape drive, or a wireless communication device.

Memory 604 includes program code for precipitation proximity notification system 108. Further, memory 604 may include other systems not shown in FIG. 6, such as an operating system (e.g., Linux) that runs on CPU 602 and provides control of various components within and/or connected to computing unit 104.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 108 for use by or in connection with a computing system 600 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic-based, magnetic-based, optical-based, electromagnetic-based, infrared-based, or semiconductor-based system (or apparatus or device). Examples of a computer-readable medium include a semiconductor or solid state memory, magnetic tape, a removable computer diskette, RAM, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of generating a notification of a status of precipitation being received by an area Thus, the present invention discloses a process for supporting computer infrastructure, comprising integrating, hosting, maintaining and deploying computer-readable code into a computing system (e.g., computing system 600), wherein the code in combination with the computing system is capable of performing a method of generating a notification of a status of precipitation being received by an area.

In another embodiment, the invention provides a business method that performs the process steps of the invention on a subscription, advertising and/or fee basis. That is, a service provider, such as a Solution Integrator, can offer to create, maintain, support, etc. a method of generating a notification of a status of precipitation being received by an area. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of generating a notification of a status of precipitation being received by an area, comprising:
   receiving, by said computing system, a plurality of parameters that includes a set of geospatial coordinates, a detection distance, said per-pixel precipitation quantity threshold and a total precipitation quantity threshold;
   receiving, by said computing system, a definition of said detection zone based on said set of geospatial coordinates and said detection distance;
   receiving, by said computing system, an image of a geographic area, wherein said image includes a plurality of pixels, wherein said plurality of pixels includes a set of pixels associated with a detection zone within said geographic area, wherein each pixel of said set of pixels is associated with a sub-area of a plurality of sub-areas of said detection zone;
   obtaining, by a computing system, a set of characteristics of said set of pixels, wherein each pixel of said set of pixels has a characteristic of said set of characteristics, and wherein said set of characteristics indicates a set of intensities of precipitation being received by said plurality of sub-areas of said detection zone;
   counting, by said computing system, one or more intensities of said set of intensities, wherein each intensity of said one or more intensities is greater than said per-pixel precipitation quantity threshold, and wherein said counting results in a count;
   determining, by said computing system and based on said count, a status of a precipitation event, wherein said status indicates precipitation is being received by said detection zone or said precipitation is not being received by said detection zone; and
   generating, by said computing system, a notification of said status.

2. The method of claim 1, wherein said determining said status comprises:
   determining said count is greater than said total precipitation quantity threshold; and
   setting said status to an indication that said detection zone is receiving said precipitation.

3. The method of claim 2, further comprising sending, by said computing system, said notification of said indication that said detection zone is receiving said precipitation.

4. The method of claim 1, wherein said determining said status comprises:
   determining said count is not greater than said total precipitation quantity threshold; and
   setting said status to an indication that said detection zone is not receiving said precipitation.

5. The method of claim 4, wherein said determining said status further comprises retrieving a previous status, wherein said previous status indicates said detection zone was receiving said precipitation prior to said determining said status.

6. The method of claim 4, further comprising sending, by said computing system, said notification of said indication that said detection zone is not receiving said precipitation.

7. The method of claim 1, wherein said image of said geographic area is a reflectivity radar image.

8. The method of claim 7, wherein said reflectivity radar image is publicly available and accessible via the Internet.

9. The method of claim 7, wherein said reflectivity radar image is a Weather Surveillance Radar 88 Doppler (WSR-88D) base reflectivity radar image.

10. A computing system comprising a processor coupled to a computer-readable memory unit, said memory unit comprising a software application, said software application comprising instructions that when executed by said processor implement the method of claim 1.

11. A computer program product, comprising a computer-readable, tangible storage device having a computer readable program code stored therein, said computer readable program code containing instructions that when executed by a processor of a computing system implement a method of generating a notification of a status of precipitation being received by an area, said method comprising:
   receiving, a plurality of parameters that includes a set of geospatial coordinates, a detection distance, said per-pixel precipitation quantity threshold and a total precipitation quantity threshold;
   receiving, a definition of said detection zone based on said set of geospatial coordinates and said detection distance;
   receiving an image of a geographic area, wherein said image includes a plurality of pixels, wherein said plurality of pixels includes a set of pixels associated with a detection zone within said geographic area, wherein each pixel of said set of pixels is associated with a sub-area of a plurality of sub-areas of said detection zone;
   obtaining a set of characteristics of said set of pixels, wherein each pixel of said set of pixels has a characteristic of said set of characteristics, and wherein said set of characteristics indicates a set of intensities of precipitation being received by said plurality of sub-areas of said detection zone;
   counting one or more intensities of said set of intensities, wherein each intensity of said one or more intensities is greater than said per-pixel precipitation quantity threshold, and wherein said counting results in a count;
   determining a status of a precipitation event based on said count, wherein said status indicates precipitation is being received by said detection zone or said precipitation is not being received by said detection zone; and
   generating a notification of said status.

12. The program product of claim 11, wherein said determining said status comprises:
   determining said count is greater than said total precipitation quantity threshold; and setting said status to an indication that said detection zone is receiving said precipitation.

13. The program product of claim 11, wherein said determining said status comprises:
   determining said count is not greater than said total precipitation quantity threshold; and setting said status to an indication that said detection zone is not receiving said precipitation.

14. The program product of claim 11, wherein said image of said geographic area is a reflectivity radar image.

15. A process for supporting computing infrastructure, said process comprising providing at least one support service for at least one of creating, integrating, hosting, maintaining, and deploying computer-readable code in a computing system, comprising a processor, wherein said processor carries out instructions contained in said code causing said computing system to perform a method of generating a notification of a status of precipitation being received by an area, said method comprising:

receiving, a plurality of parameters that includes a set of geospatial coordinates, a detection distance, said per-pixel precipitation quantity threshold and a total precipitation quantity threshold;

receiving, a definition of said detection zone based on said set of geospatial coordinates and said detection distance;

receiving an image of a geographic area, wherein said image includes a plurality of pixels, wherein said plurality of pixels includes a set of pixels associated with a detection zone within said geographic area, wherein each pixel of said set of pixels is associated with a sub-area of a plurality of sub-areas of said detection zone;

obtaining a set of characteristics of said set of pixels, wherein each pixel of said set of pixels has a characteristic of said set of characteristics, and wherein said set of characteristics indicates a set of intensities of precipitation being received by said plurality of sub-areas of said detection zone;

counting one or more intensities of said set of intensities, wherein each intensity of said one or more intensities is greater than said per-pixel precipitation quantity threshold, and wherein said counting results in a count;

determining a status of a precipitation event based on said count, wherein said status indicates precipitation is being received by said detection zone or said precipitation is not being received by said detection zone; and generating a notification of said status.

16. The process of claim 15, wherein said determining said status comprises:

determining said count is greater than said total precipitation quantity threshold; and setting said status to an indication that said detection zone is receiving said precipitation.

17. The process of claim 15, wherein said determining said status comprises:

determining said count is not greater than said total precipitation quantity threshold; and setting said status to an indication that said detection zone is not receiving said precipitation.

* * * * *